United States Patent Office 3,704,240
Patented Nov. 28, 1972

3,704,240
3-SUBSTITUTED-4-HYDROXY - 2 - SUBSTITUTED IMINO - 4 - PHENYL-5-THIAZOLIDINE ALKYL CARBOXYLIC ACIDS AND THEIR ALKYL ESTERS
Peter H. L. Wei, Springfield, and Ronald J. McCaully, Malvern, Pa., assignors to American Home Products Corporation, New York, N.Y.
No Drawing. Filed Mar. 17, 1971, Ser. No. 125,402
Int. Cl. C07d 91/14
U.S. Cl. 260—306.7                    7 Claims

ABSTRACT OF THE DISCLOSURE

Novel compounds of the formula:

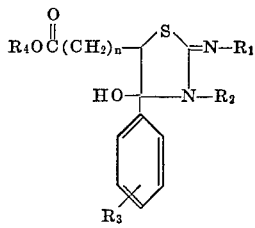

have been prepared which have antitubercular activity.

DESCRIPTION OF THE INVENTION

This invention is concerned with the preparation of novel chemical compounds which are biologically active as inhibtors of *Mycobacterium tuberculosis*, human type, strain H37Rv. The compounds are of the general formula

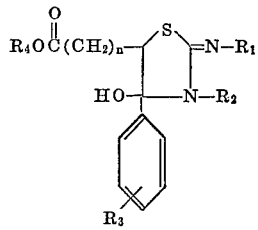

wherein $R_1$ and $R_2$ are the same and are selected from the group consisting of (lower)alkyl, phenyl, (lower)alkylphenyl, halophenyl, (lower)alkoxyphenyl, trifluoromethylphenyl, nitrophenyl, aminophenyl and phen(lower)alkyl; $R_3$ is selected from the group consisting of hydrogen, (lower)alkyl, halo, (lower)alkoxy, trifluoromethyl, nitro and amino; and $R_4$ is selected from the group consisting of hydrogen and (lower)alkyl; $n$ is the integer of from one to three; and the pharmaceutically acceptable acid addition salts thereof.

The following reaction scheme illustrates the process for the preparation of the compounds of the invention:

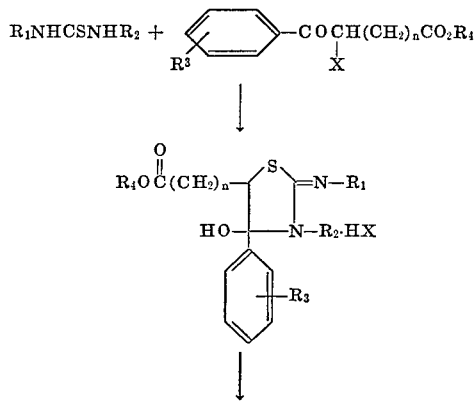

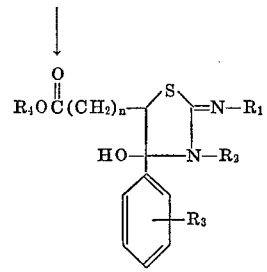

wherein $R_1$, $R_2$, $R_3$, $R_4$ and $n$ are the same as hereinabove described; and X is chloro, bromo or iodo.

The process involves dissolving a mixture of a disubstituted urea and a halo-(substituted benzoyl)alkylcarboxylic acid (which is substituted with a halogen atom on the carbon atom which is α to the ketone carbonyl) or its alkyl ester in glacial acetic acid. This is effected by warming the mixture to a temperature of 25° to 50° and maintaining the reaction mixture at that temperature until the starting materials dissolve. The reaction mixture is filtered from undissolved solid and the filtrate concentrated. The residue is treated with an inert organic solvent such as ether, acetone or acetonitrile. The hydrogen halide salt of the product is collected and recrystallized from an appropriate inert organic solvent. The salt thus obtained may be converted to the free base by neutralization with an alkaline solution (preferably a sodium bicarbonate solution), extraction with an organic solvent, such as benzene, chloroform, carbon tetrachloride, etc., and after removal of the solvent the crude material may be purified by recrystallization from an appropriate solvent.

The compounds of the invention, while not being limited thereto, are useful for the in vitro inhibition of *M. tuberculosis*. Thus the compounds may be employed for example in hospitals, sanitariums, and the like to effectively inhibit the causative organisms of tuberculosis by contacting infected areas and materials with aqueous dispersions of said compounds. Compounds of the invention have been tested by determining the minimal inhibitory concentration which will completely inhibit *Mycobacterium tuberculosis*, human type, strain H37Rv. The compounds were found to be active when admixed with the test organism in an aqueous dispersion at a concentration of 50 μg./ml.

In addition to the above-described utility the compounds have exhibited pharmacological activity as central nervous system depressants.

A limited in vivo evaluation of the pharmacological activity of the compounds of the invention was made as follows:

The compound tested was administered orally or intraperitoneally to three mice (14 to 24 grams) at each of the following doses: 400, 12, 40 and 12.7 milligrams per kilogram of host body weight (m.p.k.). The animals were watched for a minimum of two hours during which time signs of general stimulation (i.e., increased spontaneous motor activity, hyperactivity on tactile stimulation, twitching), general depression (i.e., decreased spontaneous motor activity, decreased respiration), autonomic activity (i.e., miosis, mydriasis, diarrhea) were noted.

The compounds of this invention induce central nervous system depressant effects at doses of 12.7 to 400 m.p.k. intraperitoneally. Thus the compounds of the invention have demonstrated utility as pharmacologically active compounds in experimental and comparative pharmacology and are of value in the treatment of mammals, e.g., mice, rats, etc., who are responsive to treatment with central nervous system depressant agents. Specifically the compounds may be administered for the purpose of inducing a calming effect in mammals.

When the compounds are administered to mammals as C.N.S. depressants thay may be employed alone or in combination with pharmacologically acceptable carriers, the proportion of which is determined by the solubility and nature of the particular compound, chosen route of administration and standard pharmacological practice. For example, they may be administered orally in the solid form containing such excipients as starch, milk sugar, calcium carbonate, certain types of clay or adjuvants. They may also be employed orally in the form of solutions or they may be injected parenterally. For parenteral administration they may be employed as a sterile solution containing other solutes, for example, a sufficient quantity of sodium chloride or glucose to make the solution isotonic.

As is well known to those skilled in the art, the dosage may vary with the particular subject and may be adjusted accordingly.

As used herein, the term (lower)alkyl is used to include hydrocarbon radicals containing from 1 to 6 carbon atoms both straight and branched chain, including, methyl, ethyl, i-propyl, n-propyl, n-butyl and the like. The terms halo and halogen are used to include chloro, iodo, bromo and fluoro.

The following examples illustrate but do not necessarily limit the scope of the invention:

EXAMPLE 1

3-benzyl-2-benzylimino-4-(p-chlorophenyl)-4-hydroxy-5-thiazolidineacetic acid, hydrobromide 3-bromo - 3 - (p-chlorobenzoyl)propionic acid (8.7 g., 0.03 m.) and 1,3-dibenzyl thiourea (7.68 g., 0.03 m.) are dissolved in warm glacial acetic acid. After some insoluble material is filtered off, the solvent is removed. The oily residue is first washed with ether and then treated with acetone. The crude solid material (11.4 g.) is recrystallized from acetonitrile to give a pure product, M.P. 173–175° C. The IR spectrum (KBr) shows absorptions at 3.3µ (tert. amino HBr) 5.8 (carboxylic acid CO), and 7.2 (aromatic C=N).

*Analysis.*—Calcd. for $C_{25}H_{23}ClN_2O_3S$ HBr (percent): C, 54.80; H, 4.42; Br, 14.58; Cl, 6.41; N, 5.11; S, 5.85. Found (percent): C, 55.16; H, 4.48; Br, 14.90; Cl, 6.61; N, 5.09; S, 5.97.

In a similar manner, using the appropriate starting materials, the following compounds are provided:

4-hydroxy-3-methyl-2-methylimino-4-phenyl-5-thiazolodineacetic acid, hydrobromide;
3-(m-chlorophenyl)-2-(m-chlorophenylimino)-4-(m-ethoxyphenyl)-4-hydroxy-5-thiazolidineacetic acid, hydrochloride; and
4-(p-t-butylphenyl)-4-hydroxy-3-(p-nitrophenyl)-2-(p-nitrophenylimino)-5-thiazolidineacetic acid, hydrobromide.

EXAMPLE II 3-benzyl-2-benzylimino-4-(p-chlorophenyl)-4-hydroxy-5-thiazolidineacetic acid, ethyl ester A mixture of 3-bromo-3-(p-chlorobenzyl)propionic acid, ethyl ester (6.4 g., 0.02 m.), 1,3-dibenzylthiourea (5.1 g., 0.02 m.) and glacial acetic acid is warmed on a steam bath until the solids dissolve. After the solvent is removed, the residue is treated with benzene to give 11.4 g. of crude solid. The solid HBr salt is dissolved in chloroform and neutralized with dilute sodium bicarbonate solution. The chloroform solution is dried over anhydrous magnesium sulfate and evaporated to a residual oil that solidifies. Recrystallization of the crude material from cyclohexane afford 7.2 g. of product, M.P. 107°–109° C. The IR spectrum shows absorptions at 3.2µ (OH), 5.8 (ester CO) and 6.25 (C=N and aromatic). The NMR spectrum (CDCl₃): δ7.0 (4, m.) 4.4 (s., 2, $CH_2C_6H_5$), 4.3 (s., 2, $CH_2C_6H_5$), 3.9 (m., 3, —OH and $OCH_2$), 2.95 (s., 1, OH), 2.5 (d., 2, J=7.5 Hz. $CHCH_3$), two methylene protons at 2.5δ as two inglets and three 1.1 (t., 3, J=Hz., $CH_2CH_3$).

*Analysis.*—Calcd. for $C_{27}H_{27}ClN_2O_3S$ (percent): C, 65.51; H, 5.50; Cl, 7.16; N, 5.66; S, 6.48. Found (percent): C, 65.69; H, 5.65; Cl, 7.22; N, 5.87; S, 6.64.

In a similar manner, using the appropriate starting materials the following compounds are provided:

4-(o-anisyl)-3-(p-fluorophenyl)-2-(p-fluorophenylimino)-4-hydroxy-5-thiazolidineacetic acid, methyl ester; and
3-(p-aminophenyl)-2-(p-aminophenylimino)-4-(p-chlorophenyl)-5-thiazolidineacetic acid, propyl ester.

EXAMPLE III 4-(p - chlorophenyl) - 3 - (p-ethoxyphenyl)-2-(p-ethoxyphenylimino) - 4 - hydroxy - 5 - thiazolidineacetic acid, hydrobromide The reaction between 3-bromo-3-(p-chlorobenzoyl) propionic acid (8.79 g., 0.03 m.) and 1,3-di(p-ethoxyphenyl)thiourea (9.57 g., 0.03 m.) is carried out according to the procedure of Example I to give 8.0 g. of the title compound, M.P. 223–225° C. The IR (KBr) spectrum shows absorptions 3.2µ (OH and amine HBr), at 5.85 (carboxylic acid), 6.2 (C=N and aromatic). The NMR spectrum (DMSO-$d_6$ δ7.3 (m. 12), 4.7 (m., 1), 4.05 (m., 4, overlapping $CH_2CH_3$), 2.8 (m., 2), 1.3 (6, m., overlapping $OCH_2CH_3$).

*Analysis.*—Calcd. for $C_{27}H_{27}ClN_2O_5S \cdot HBr$ (percent): C, 55.33; H, 4.64; Br, 13.14; Cl, 5.83; N, 4.61; S, 5.27. Found (percent): C, 52.95; H, 4.73; Br, 13.19; Cl, 5.85; N, 4.52; S, 5.53.

In a similar manner, using the appropriate starting materials, the following compounds are provided:

3-hexyl-2-hexylimino-4-hydroxy-4-(p-propylphenyl)-5-thiazolidineacetic acid, hydrobromide;
4-(p-trifluoromethylphenyl)-4-hydroxy-3-(p-iodophenyl)-2-(p-iodophenylimino)-5-thiazolidineacetic acid, hydroiodide;
3-benzyl-2-benzylimino-4-(p-bromophenyl)-4-hydroxy-5-thiazolidineacetic acid, hydrobromide; and
4-(m-bromophenyl)-4-hydroxy-3-(p-tolyl)-2-(p-tolylimino)-5-thiazolidineacetic acid, hydrobromide.

EXAMPLE IV

4 - (p - chlorophenyl) - 3-(p-ethoxyphenyl)-2-(p-ethoxyphenylimino) - 4 - hydroxy - 5-thiazolidine acetic acid, ethyl ester The reaction between 3-bromo-3-(p-chlorobenzoyl) propionic acid, ethyl ester (6.4 g., 0.02 m.) and 1,3-di(p-ethoxyphenyl)thiourea (6.4 g., 0.02 m.) is carried out according to the procedure of Example II to give 5.0 g. of crude title product, M.P. 134–136° Recrystallization in benzene affords pure product, M.P. 146–147° C. The IR spectrum (KBr) shows the following absorptions: 2.9µ (OH), 5.8 (ester), 6.15 (C=N and aromatic). The NMR spectrum (CDCl₃) 6.8 (m., 12), 3.8 (m., 8, overlapping $OCH_2CH_2$, CH, and OH), 2.6 (d., 2, J=6.5 Hz., —$CHCH_2$), 1.2 (m., 9, overlapping —$OCH_2CH_3$).

*Analysis.*—Calcd. for $C_{29}H_{31}ClN_2O_5S$ (percent): C, 62.73; H, 5.63; Cl, 6.29; N, 5.05. Found (percent): C, 62.92; H, 5.84; Cl, 6.77; N, 5.20.

In a similar manner, using the appropriate starting materials, the following compounds are provided:

3-benzyl-2-benzylimino-4-(p-bromophenyl)-4-hydroxy-5-thiazolidineacetic acid, ethyl ester;
3-(p-anisyl)-2-(p-anisylimino)-4-hydroxy-4-(m-nitrophenyl)-4-thiazolidineacetic acid, n-butyl ester; and
3-(p-ethylphenyl)-2-(p-ethylphenylimino)-4-(p-fluorophenyl)-5-hydroxy-5-thiazolidineacetic acid, ethyl ester.

EXAMPLE V 3-ethyl-2-ethylimino-4-(p-fluorophenyl)-4-hydroxy-5-thiazolidinepropionic acid, methyl ester 4-bromo-4-(p-fluorobenzoyl)butyric acid, methyl ester and 1,3-diethylthiourea are placed in glacial acetic acid warmed in a steam bath until the solids dissolve. After the solvent is removed, by vacuum distillation, the residue is treated with benzene to give a solid. The solid HBr salt is dissolved in chloroform and neutralized with dilute sodium bicarbonate solution. The chloroform solution is dried over anhydrous magnesium sulfate and evaporated to a residual oil that solidifies. Recrystallization of the crude material from cyclohexane affords the pure product.

In a similar manner, using the appropriate starting materials, the following compound is provided:

4-(p-aminophenyl)-3-(p-ethoxyphenyl)-2-(p-ethoxyphenylimino)-4-hydroxy-5-thiazolidinepropionic acid, ethyl ester.

EXAMPLE VI 3-(p-bromophenyl)-2-(p-bromophenylimino)-4-(p-iodophenyl)-4-hydroxy-5-thiazolidinebutyric acid, butyl ester 5-bromo-5-(p-iodobenzoyl)valeric acid, butyl ester and 1,3-di(p-bromophenyl)thiourea are placed in glacial acetic acid and warmed in a steam bath until the solids dissolve. After the solvent is removed, by vacuum distillation, the residue is treated with benzene to give a solid. The solid HBr salt is dissolved in chloroform and neutralized with dilute sodium bicarbonate solution. The chloroform solution is dried over anhydrous magnesium sulfate and evaporated to a residual oil that solidifies. Recrystallization of the crude material from cyclohexane affords the pure product.

In a similar manner, using the appropriate starting materials, the following compound is provided:

4-(p-t-butylphenyl)-3-(p-trifluoromethylphenyl)-2-(p-trifluoromethylphenylimino)-4-hydroxy-5-thiazolidinebutyric acid, methyl ester.

We claim:
1. A compound selected from the group consisting of those having the formula:

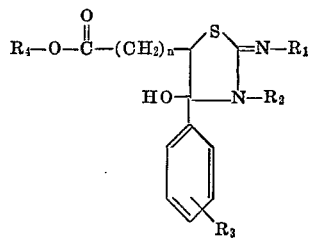

wherein $n$ is an integer of from 1 to 3; $R_1$ and $R_2$ are the same and selected from the group consisting of (lower) alkyl, phenyl, (lower)alkylphenyl, halophenyl, (lower) alkoxyphenyl, trifluoromethylphenyl, nitrophenyl, aminophenyl and phen(lower)alkyl; $R_3$ is selected from the group consisting of hydrogen, (lower)alkyl, halo, (lower) alkoxy, trifluoromethyl, nitro and amino; and $R_4$ is selected from the group consisting of hydrogen and (lower)alkyl; and the pharmaceutically acceptable acid addition salts thereof.

2. A compound as set forth in claim 1, which is: 3-benzyl - 2 - benzylimino - 4-(p-chlorophenyl)-4-hydroxy-5-thiazolidineacetic acid, hydrobromide.

3. A compound as set forth in claim 1, which is: 3-benzyl - 2 - benzylimino-4-(p-chlorophenyl)-4-hydroxy-5-thiazolidineacetic acid, ethyl ester, hydrobromide.

4. A compound as set forth in claim 1, which is: 3-benzyl - 2 - benzylimino-4-(p-chlorophenyl)-4-hydroxy-5-thiazolidineacetic acid, ethyl ester.

5. A compound as set forth in claim 1, which is: 4-(p-chlorophenyl) - 3 - (p-ethoxyphenyl)-2-(p-ethoxyphenylimino)-4-hydroxy-5-thiazolidineacetic acid, hydrobromide.

6. A compound as set forth in claim 1, which is: 4-(p-chlorophenyl) - 3 - (p-ethoxyphenyl)-2-(p-ethoxyphenylimino)-4-hydroxy-5-thiazolidineacetic acid, ethyl ester, hydrobromide.

7. A compound as set forth in claim 1, which is: 4-(p-chlorophenyl) - 3 - (p-ethoxyphenyl)-2-(p-ethoxyphenylimino)-4-hydroxy-5-thiazolidineacetic acid, ethyl ester.

References Cited
UNITED STATES PATENTS

| | | | |
|---|---|---|---|
| 3,560,515 | 2/1971 | Elslager et al. | 260—306.7 |
| 3,621,028 | 11/1971 | Newberry | 260—306.7 |
| 3,418,331 | 12/1968 | Yates et al. | 260—302 |

ALTON D. ROLLINS, Primary Examiner

R. J. GALLAGHER, Assistant Examiner

U.S. Cl. X.R.

424—270